July 19, 1927.
N. K. AHL
1,636,583
VEGETABLE SLICER
Filed Sept. 1, 1925
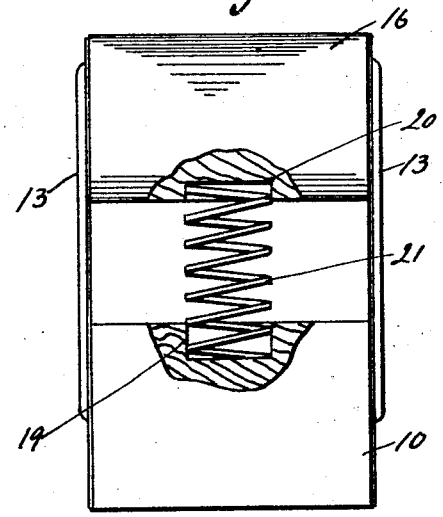
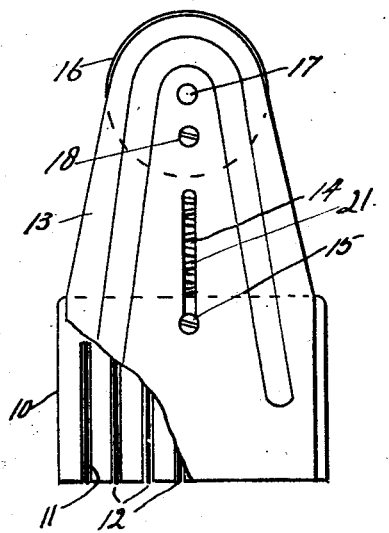
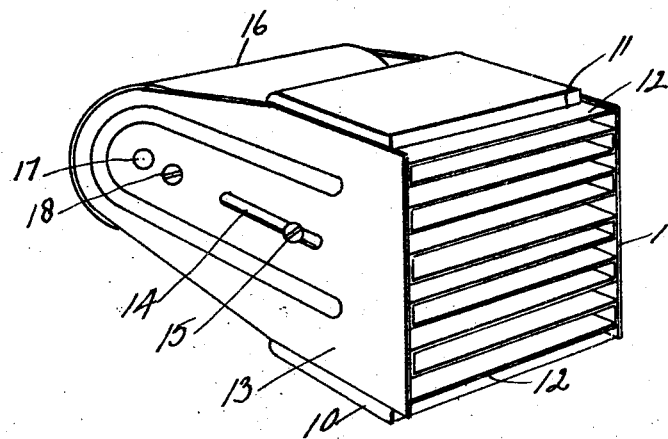
Inventor
Neils K. Ahl
By W. W. Williamson
Atty.

Patented July 19, 1927.

1,636,583

UNITED STATES PATENT OFFICE.

NIELS K. AHL, OF PHILADELPHIA, PENNSYLVANIA.

VEGETABLE SLICER.

Application filed September 1, 1925. Serial No. 53,813.

My invention relates to a new and useful improvement in vegetable slicers, and has for its object to provide a combined presser and stripper for a series of knives so that when the device is in use the material being sliced or cut will be held against displacement, and upon the return stroke of the gang of knives, the material will be stripped from said knives.

With these and other objects in view, my invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a front elevation of what I call a cutting block, having my improvement embodied therein, a portion of the block and handle being broken away and sectioned to clearly show the seating of the actuating spring in these members.

Fig. 2, is an end elevation of Fig. 1, a portion of one of the handle plates being broken away to show the arrangement of the knives in the block.

Fig. 3, is a perspective of the device shown in Figs. 1 and 2.

In carrying out my invention as herein embodied, 10, represents a combined slicer and stripper block, having a series of slots 11 therein, dividing the block into a series of ribs. Fitted to slide in these slots is a gang of knives 12, the latter being secured in any convenient manner to the handle plates 13, serving as knife carriers.

Each of these handle plates has a slot 14, formed therein, and 15 represents a screw, of which there are two, each passing through one of the slots 14, and being secured in the stripper block.

These screws serve to guide and limit the movement of the handle plates and consequently of the knives carried thereby.

16 represents a handle secured by the upper ends of the handle plates in any convenient manner, as for instance, by a rod 17, passing horizontally through the center of the handles and the handle plates and screws 18, passing through suitable holes in the handle plates and threaded into the handle.

Within the stripper block is formed a recess 19 and a corresponding recess 20, is formed in the underside of the recesses. In these recesses are seated the ends of the coil spring 21, which latter normally holds the handle in its elevated position, and consequently the knives carried by the handle plates, and this spring is of proper tension to permit the ready depression of the handle and to effect its return to the normal position when pressure is removed from the handle.

From the foregoing description the operation of my improved slicer, will be obviously as follows:

By grasping the handle, bringing the under surface of the stripper block in contact with the material to be cut and forcing the handle downward, the knives will be forced through the material, slicing said material into layers represented by the spacing between the knives. During this process the spring 21 will be compressed.

Now, by lessening the pressure upon the handle the spring will be permitted to force said handle upward, thus elevating the knives, during which movement the ribs of the stripper blocks will strip the material from the knives.

The movement of the device from place to place over the material, and the repeating of the above-described operation will cut the material as finely as desired, and during this operation, the stripper block exerting pressure upon the material being cut will prevent the particles thereof, from scattering or flying, this being of great convenience in chopping up certain classes of material.

The lower edges of the handle plates are adapted to cut the material at the same time the knives 12, are cutting said material at right angles to these handle plates.

Of course I do not wish to be limited to the exact details of construction as herein shown as these may be varied within the limits of the appended claims without departing from the spirit of my invention.

Having thus fully described my invention, what I claim as new and useful is:

1. A slicer comprising two side plates, the lower edges of which terminate in knives; cross knives secured to said plates in such manner as to space the latter apart; a block fitted to slide between said plates, said block having slots therein in which the cross knives are adapted to move vertically, said slots forming bars for stripping both sides of all the cross knives; screws passing through slots formed in the plates; said screws being secured in the block and serving to limit the sliding movements of the plates; a handle secured between the upper ends of said plates; and a coil spring, the lower end of which is seated in a recess formed in the block, the upper end thereof being seated in the recess formed in the handle.

2. In a slicer of the character described, two side plates, their lower edges terminating in knives; a gang of cross knives carried by the plates; and a handle secured between the upper ends of the plates for operating the slicer.

3. A slicer comprising side plates, a handle mounted between the upper ends of said plates to assist in holding the latter in parallel spaced relation, a stripper block slidably mounted between said plates and having a plurality of slots in its lower portion, a plurality of knives for registration with the slots and having their ends fixed to the side plates and assisting in holding said plates in parallel spaced relation, and means to normally force the stripper block outward.

In testimony whereof, I have hereunto affixed my signature.

NIELS K. AHL.